(12) United States Patent
Chakraborty et al.

(10) Patent No.: US 7,570,164 B2
(45) Date of Patent: Aug. 4, 2009

(54) SYSTEM AND METHOD FOR IMPLEMENTING VIRTUAL RFID TAGS

(75) Inventors: Sayan Chakraborty, Niwot, CO (US); Brian McKinney, Lakewood, CO (US)

(73) Assignee: SkyeTek, Inc., Westminster, CO (US)

(*) Notice: Subject to any disclaimer, the term of this patent is extended or adjusted under 35 U.S.C. 154(b) by 385 days.

(21) Appl. No.: 11/323,214

(22) Filed: Dec. 30, 2005

(65) Prior Publication Data
US 2007/0159330 A1 Jul. 12, 2007

(51) Int. Cl.
*G08B 13/14* (2006.01)
(52) U.S. Cl. .................. 340/572.1; 340/10.1; 340/505; 709/217
(58) Field of Classification Search ............. 340/572.1, 340/10.1, 571, 505, 539.16, 539.17, 539.22, 340/539.26, 870.11, 870.16; 709/217; 455/41.2, 455/456.1, 517, 39
See application file for complete search history.

(56) References Cited

U.S. PATENT DOCUMENTS

| | | | |
|---|---|---|---|
| 3,842,350 A | 10/1974 | Gross | |
| 4,093,919 A | 6/1978 | Watanabe | |
| 5,013,898 A | 5/1991 | Glasspool | |
| 5,455,575 A | 10/1995 | Schuermann | |
| 5,519,381 A | 5/1996 | Marsh et al. | |
| 5,745,037 A | 4/1998 | Guthrie et al. | |
| 5,751,220 A | 5/1998 | Ghaffari | |
| 5,777,561 A | 7/1998 | Chieu et al. | |
| 5,887,176 A | 3/1999 | Griffith et al. | |
| 5,920,261 A | 7/1999 | Hughes et al. | |
| 5,929,779 A | 7/1999 | MacLellan et al. | |
| 5,952,922 A | 9/1999 | Shober | |
| 6,078,251 A | 6/2000 | Landt et al. | |
| 6,161,724 A | 12/2000 | Blacker et al. | |
| 6,182,214 B1 | 1/2001 | Hardjono | |
| 6,192,222 B1 | 2/2001 | Greef et al. | |
| 6,259,367 B1 | 7/2001 | Klein | |
| 6,304,613 B1 | 10/2001 | Koller et al. | |
| 6,317,027 B1 | 11/2001 | Watkins | |
| 6,377,176 B1 | 4/2002 | Lee | |
| 6,420,961 B1 | 7/2002 | Bates et al. | |
| 6,483,427 B1 * | 11/2002 | Werb ......................... 340/10.1 |
| 6,496,806 B1 * | 12/2002 | Horwitz et al. ............... 705/28 |
| 6,509,828 B2 | 1/2003 | Bolavage et al. | |
| 6,526,264 B2 | 2/2003 | Sugar et al. | |

(Continued)

FOREIGN PATENT DOCUMENTS

EP 1772812 A2 4/2007

(Continued)

OTHER PUBLICATIONS

PCT/US06/015092 International Search Report & Written Opinion mailed Aug. 23, 2007.

(Continued)

*Primary Examiner*—Anh V La
(74) *Attorney, Agent, or Firm*—Lathrop & Gage LLP

(57) ABSTRACT

A method for implementing a virtual tag in an RFID tag reading system. In one embodiment, data is read from the memory of an RFID tag and stored in tag cache memory. Commands intended for the tag are queued in the tag cache, and the commands queued in the tag cache are executed in response to occurrence of an event. A result is provided as if the command had been applied to the tag at the time of an initial request to send commands to the tag.

42 Claims, 5 Drawing Sheets

U.S. PATENT DOCUMENTS

| | | | |
|---|---|---|---|
| 6,531,957 | B1 | 3/2003 | Nysen |
| 6,539,422 | B1 | 3/2003 | Hunt |
| 6,617,962 | B1 | 9/2003 | Horwitz et al. |
| 6,677,852 | B1 | 1/2004 | Landt |
| 6,717,516 | B2 | 4/2004 | Bridgelall |
| 6,903,656 | B1 | 6/2005 | Lee |
| 6,985,931 | B2 | 1/2006 | Dowling |
| 6,992,567 | B2 | 1/2006 | Cole et al. |
| 7,026,935 | B2 | 4/2006 | Diorio et al. |
| 7,075,412 | B1 | 7/2006 | Reynolds et al. |
| 7,197,279 | B2 | 3/2007 | Bellantoni |
| 7,367,020 | B2 | 4/2008 | Bickle et al. |
| 7,375,616 | B2 | 5/2008 | Rowse et al. |
| 7,378,967 | B2 | 5/2008 | Sullivan |
| 2002/0036569 | A1 | 3/2002 | Martin |
| 2002/0131595 | A1 | 9/2002 | Ueda et al. |
| 2003/0007473 | A1 | 1/2003 | Strong et al. |
| 2003/0055667 | A1 | 3/2003 | Sgambaro et al. |
| 2003/0081785 | A1 | 5/2003 | Boneh et al. |
| 2003/0173403 | A1 | 9/2003 | Vogler |
| 2004/0069852 | A1 | 4/2004 | Seppinen et al. |
| 2004/0087273 | A1 | 5/2004 | Perttila et al. |
| 2004/0089707 | A1 | 5/2004 | Cortina et al. |
| 2004/0176032 | A1 | 9/2004 | Kotola et al. |
| 2004/0179684 | A1 | 9/2004 | Appenzeller et al. |
| 2004/0212493 | A1 | 10/2004 | Stilp |
| 2004/0232220 | A1 | 11/2004 | Beenau et al. |
| 2005/0036620 | A1 | 2/2005 | Casden et al. |
| 2005/0063004 | A1 | 3/2005 | Silverbrook |
| 2005/0083180 | A1 | 4/2005 | Horwitz et al. |
| 2005/0088299 | A1 | 4/2005 | Bandy et al. |
| 2005/0105600 | A1 | 5/2005 | Culum et al. |
| 2005/0116813 | A1 | 6/2005 | Raskar |
| 2006/0006986 | A1 | 1/2006 | Gravelle et al. |
| 2006/0022815 | A1 | 2/2006 | Fischer et al. |
| 2006/0038659 | A1 | 2/2006 | Takano et al. |
| 2006/0238305 | A1 | 10/2006 | Loving et al. |
| 2007/0001813 | A1 | 1/2007 | Maguire et al. |
| 2007/0008132 | A1 | 1/2007 | Bellantoni |
| 2007/0024424 | A1 | 2/2007 | Powell |
| 2007/0205871 | A1 | 9/2007 | Posamentier |
| 2008/0143482 | A1 | 6/2008 | Shoarinejad et al. |
| 2008/0143485 | A1 | 6/2008 | Frerking |

FOREIGN PATENT DOCUMENTS

| | | |
|---|---|---|
| JP | 2002288598 | 10/2002 |
| WO | WO2004/047000 | 6/2004 |
| WO | WO2006123316 | 11/2006 |
| WO | WO/2007/094868 | 8/2007 |

OTHER PUBLICATIONS

PCT/US06/015092 International Preliminary Report on Patentability; Oct. 23, 2007.
PCT/US06/015093 International Search Report & Written Opinion mailed Feb. 22, 2007.
PCT/US06/015093 International Preliminary Report on Patentability; Oct. 23, 2007.
PCT/US06/015342 International Search Report & Written Opinion mailed Jul. 6, 2007.
PCT/US06/015342; International Preliminary Report on Patentability; Oct. 24, 2007.
PCT/US06/015343 International Search Report & Written Opinion mailed Nov. 13, 2006.
PCT/US06/015343; International Preliminary Report on Patentability; Oct. 24, 2007.
PCT/US06/015344 International Search Report & Written Opinion mailed Oct. 4, 2006.
PCT/US06/015344 International Preliminary Report on Patentability; Oct. 24, 2007.
PCT/US06/015347 International Search Report & Written Opinion mailed Sep. 28, 2006.
PCT/US06/015347 International Preliminary Report on Patentability; Oct. 24, 2007.
PCT/US06/027164 International Search Report & Written Opinion mailed Oct. 26, 2007.
PCT/US06/027164 International Preliminary Report on Patentability; Mar. 4, 2008.
PCT/US06/034023 International Search Report & Written Opinion mailed Aug. 10, 2007.
PCT/US06/034023 International Preliminary Report on Patentability; Mar. 4, 2008.
PCT/US06/26933 International Search Report & Written Opinion mailed Dec. 20, 2007.
Gagne, Martin, "Identity-Based Encryption: a Survey," Cryptobytes—the Technical Newsletter of RSA Laboratories, Spring 2003.
Gemmell, Peter, "An Introduction to Threshold Cryptography," Cryptobytes—the Technical Newsletter of RSA Laboratories, Winter 1997.
Shamir, Adi, "How to Share a Secret," Communications of the ACM, vol. 22 Issue 11 (Nov. 1979).
Shamir, Adi, "Identity-Based Cryptosystems and Signature Schemes," Proceedings of Crypto '84, pp. 47-53.
Schneier, Bruce, Applied Cryptography, 2nd Edition, Wiley and Sons, 1996, pp. 71-73 and 528-531.
Microsoft Corporation, "Description of the Secure Sockets Layer (SSL) Handshake," Article ID: 257591, Jun. 23, 2005.
PCT/US06/015094 International Search Report & Written Opinion mailed Sep. 22, 2008, 10 pages.
European Application No. 08001003, Search Report Aug. 7, 2008, 5 pages.
European Application No. 08006104, Search Report, Nov. 28, 2008, 4 pages.
European Application No. 08011298 Search Report, Sep. 19, 2008, 6 pages.
U.S. Appl. No. 11/513,667 Notice of Allowance and Interview Summary mailed Sep. 9, 2008, 9 pages.
U.S. Appl. No. 11/409,463, Office Action mailed Jun. 27, 2008, 12 pages.
U.S. Appl. No. 11/408,652, Restriction Requirement mailed Apr. 28, 2008, 11 pages.
U.S. Appl. No. 11/408,652, Response to Restriction Requirement filed May 28, 2008, 8 pages.
U.S. Appl. No. 11/408,652, Office Action mailed Oct. 1, 2008, 9 pages.
U.S. Appl. No. 11/387,422, Office Action mailed Office Action mailed Jun. 16, 2008, 8 pages.
U.S. Appl. No. 11/328,209, Office Action mailed Dec. 19, 2008, 10 pages.
U.S. Appl. No. 11/301,770, Response to Office Action filed Sep. 5, 2008, 3 pages.
U.S. Appl. No. 11/301,770, Office Action mailed Jun. 6, 2008, 10 pages.
U.S. Appl. No. 11/301,770 Office Action mailed Dec. 10, 2008, 10 pages.
U.S. Appl. No. 11/301,587, Response to Office Action filed Dec. 16, 2008, 10 pages.
U.S. Appl. No. 11/301,587, Office Action Mailed Sep. 16, 2008, 11 pages.
U.S. Appl. No. 11/301,423, Office Action mailed Jun. 26, 2008, 12 pages.
U.S. Appl. No. 11/301,423, Response to Office Action filed Sep. 26, 2008, 4 pages.
U.S. Appl. No. 11/301,423, Office Action filed Dec. 30, 2008, 14 pages.
U.S. Appl. No. 11/301,396, Office Action mailed Office Action mailed Jun. 26, 2008, 9 pages.
U.S. Appl. No. 11/301,396, Response to Office Action filed Sep. 26, 2008, 5 pages.

* cited by examiner

SYSTEM AND METHOD FOR IMPLEMENTING VIRTUAL RFID TAGS

BACKGROUND

RFID stands for Radio-Frequency IDentification. An RFID transponder, or 'tag', serves a similar purpose as a bar code or a magnetic strip on the back of a credit card; it provides an identifier for a particular object, although, unlike a barcode or magnetic strip, some tags support being written to. An RFID system carries data in transponders in these tags, and retrieves data from the tags wirelessly. Data within a tag may provide identification for an item in manufacture, goods in transit, a location, the identity of a vehicle, an animal, or an individual. By including additional data, the ability is provided for supporting applications through item-specific information or instructions available on reading the tag.

A basic RFID system includes a transceiver (a reader or 'interrogator') and a transponder (RF tag) electronically programmed with unique identifying information. Both the transceiver and transponder have antennas, which respectively emit and receive radio signals to activate the tag and read and write data to it. An antenna is a feature that is present in both readers and tags, essential for the communication between the two. An RFID system requires, in addition to tags, a means of reading or interrogating the tags and usually requires some means of communicating RFID data to a host device, e.g., a computer or information management system. Often the antenna is packaged with the transceiver and decoder to become a reader (an 'interrogator'), which can be configured either as a handheld or a fixed-mount device. The reader emits radio waves in ranges of anywhere from one inch to 100 feet or more, depending upon its power output and the radio frequency used. When an RFID tag passes through the electromagnetic zone (its 'field') created by the reader, it detects the reader's activation signal. The reader decodes the data encoded in the tag's integrated circuit and the data is often passed to a device (e.g., a computer) for processing.

Two methods distinguish and categorize RFID systems, one based upon close proximity electromagnetic or inductive coupling, and one based upon propagating electromagnetic waves. Coupling is via 'antenna' structures forming an integral feature in both tags and readers. While the term antenna is generally considered more appropriate for propagating systems it is also loosely applied to inductive systems.

Transponders/Tags

The word transponder, derived from TRANSmitter/re-sPONDER, reveals the function of a tag. A tag responds to a transmitted or communicated request for the data it carries, the communication between the reader and the tag being wireless across the space between the two. The essential components that form an RFID system are one or more tags and a reader or interrogator. The basic components of a transponder are, generally speaking, fabricated as low power integrated circuit suitable for interfacing to an external coil, or utilizing 'coil-on-chip' technology, for data transfer and power generation, where the coil acts as an antenna matched to the frequency supported.

Basic Features of an RFID Transponder

The transponder includes memory which may comprise read-only (ROM), random access (RAM) or non-volatile programmable memory for data storage, depending upon the type of the device. ROM-based memory is used to accommodate security data and the transponder operating system instructions which, in conjunction with the processor or processing logic, deals with the internal 'house-keeping' functions such as response delay timing, data flow control and power supply switching. RAM-based memory is used to facilitate temporary data storage during transponder interrogation and response.

Non-volatile programmable memory may take various forms, electrically erasable programmable read only memory (EEPROM) being typical. This type of memory is used to store the transponder data and needs to be non-volatile to ensure that the tag data is retained when the device is in its quiescent or power-saving 'sleep' state or when the tag is not powered on.

Data buffers are further components of memory, used to temporarily hold incoming data following demodulation and outgoing data for modulation and interface with the transponder antenna. Interface circuitry provides the facility to direct and accommodate the interrogation field energy for powering purposes in passive transponders and triggering of the transponder response. The transponder antenna is the mechanism by which the device senses the interrogating field and also serves to transmit the transponder response to interrogation.

RFID tags come in a wide variety of shapes and sizes. Animal tracking tags, inserted beneath the skin, can be as small as a pencil lead in diameter and 10 millimeters in length. Tags can be manufactured in many different shapes, including credit-card form factors for use in access applications. The anti-theft hard plastic tags attached to merchandise in stores are RFID tags. In addition, heavy-duty transponders are used to track intermodal containers, heavy machinery, trucks, and railroad cars for maintenance and other applications.

Powering Tags

Tags require power to work, even though the power levels required for operation are invariably very small (microwatts to milliwatts). RFID tags are categorized as active, passive, or semi-active/semi-passive, the designation being determined by the manner in which the device derives its power.

Active RFID tags are powered by an internal battery and are typically read/write devices, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data then becomes part of the tagged part's history. The battery-supplied power of an active tag generally gives it a longer read range. The trade-off is greater size, greater cost, and a limited operational life (which may yield a lifetime of 10 years, depending upon operating temperatures and battery type).

In general terms, active transponders allow greater communication range than can be expected for passive devices, better noise immunity and higher data transmissions rates when used to power a higher frequency response mode.

Passive tags operate without an internal battery source, deriving the power to operate from the field generated by the reader. Passive tags are consequently much lighter than active tags, less expensive, and offer a virtually unlimited operational lifetime. The trade-off is that they have shorter read ranges than active tags and require a higher-powered reader. Passive tags are also constrained in their capacity to store data (which is directly related to tag size and not power) and the ability to perform well in electromagnetically noisy environments. However, a passive tag must be powered without interruption, and storing a lot of data on a tag is subject to difficulty in reliably reading that data from the tag. Sensitivity and orientation performance may also be constrained by the limitation on available power. Despite these limitations passive transponders offer advantages in terms of cost and longevity. They have an almost infinite lifetime and are generally less expensive than active transponders.

Read-only tags are typically passive and are programmed with a unique set of data (usually 32 to 128 bits) that cannot be modified. Read-only tags most often operate as a license plate into a database, in the same way as linear barcodes reference a database containing modifiable product-specific information. Semi-active/semi-passive tags use a battery to assist the interrogator.

Data Carrying Options

Data stored in data carriers invariable require some organization and additions, such as data identifiers and error detection bits, to satisfy recovery needs. This process is often referred to as source encoding. Standard numbering systems, such as UCC/EPC and associated data defining elements may also be applied to data stored in tags. The amount of data is application-dependent. Basically, tags may be used to carry drug pedigrees, manifests, product identification information, etc., as well as:

identifiers, in which a numeric or alphanumeric string is stored for identification purposes or as an access key to data stored elsewhere in a computer or information management system, and/or portable data files, in which information can be organized, for communication or as a means of initiating actions without recourse to, or in combination with, data stored elsewhere.

In terms of data capacity, tags can be obtained that satisfy needs from single bit to kilobits. The single bit devices are essentially for surveillance purposes. Retail electronic article surveillance (EAS) is the typical application for such devices, being used to activate an alarm when detected in the interrogating field. They may also be used in counting applications.

Tag devices characterized by data storage capacities up to 128 bits are sufficient to hold a serial or identification number together, possibly, with parity check bits. Such devices may be manufacturer or user programmable. Tags with data storage capacities up to 512 bits are invariably user programmable, and suitable for accommodating identification and other specific data such as serial numbers, package content, key process instructions or possibly results of earlier interrogation/response transactions.

Tags characterized by data storage capacities of around 64 kilobits may be regarded as carriers for portable data files. With increased capacity the facility can also be provided for organizing data into fields or pages that may be selectively interrogated during the reading process.

Data programming options

Depending upon the type of memory a tag contains the data carried may be read-only, write once read many (WORM) or read/write. Read-only tags are invariably low capacity devices programmed at source, usually with an identification number. WORM devices are user programmable devices. Read/write devices are also user-programmable but allow the user to change data stored in a tag. Portable programmers (interrogators) may be recognized that also allow in-field programming of the tag while attached to the item being identified or accompanied.

The Reader/Interrogator

Reader/interrogators can differ quite considerably in complexity, depending upon the type of tags being supported and the functions to be fulfilled. However, their overall function is to provide a mechanism for communicating with the tags, providing power to passive tags, and facilitating data transfer. Functions performed by the reader may include signal conditioning, parity error checking and correction. Once the signal from a transponder has been correctly received and decoded, algorithms may be applied to decide whether the signal is a repeat transmission, and may then instruct the transponder to cease transmitting. This is known as a 'Command Response Protocol' and is used to circumvent the problem of reading multiple tags in a short space of time. Using interrogators in this way is sometimes referred to as 'Hands Down Polling'. An alternative, more secure, but slower tag polling technique is called 'Hands Up Polling', which involves the interrogator looking for tags with specific identities, and interrogating them in turn. This technique requires contention management, and a variety of techniques have been developed to improve the process of batch reading, including anti-collision techniques.

Current RFID systems require that a tag be in the field of the reader (interrogator), and powered on, in order for the user to interact with it. This is the case even when, for example, a series of users are simply reading the same, unchanging value off the tag, such as the tag ID. Furthermore, current tags are limited to the capabilities inherent in the tag. In multiple tag type environments, an RFID system is typically forced to use the common subset of tag capabilities, and have limited ability to support new, enhanced tags. In addition, current tags must receive commands as they are issued (and thus must be in-field for the command to work). If several commands do essentially the same thing (such as writing a value) but only the last one matters (e.g., a count or a total value), the tag must still be powered up and written to for each of the commands.

SUMMARY

A method is disclosed for implementing a virtual tag in an RFID tag reading system. In one embodiment, data is read from the memory of an RFID tag and stored in tag cache memory. Commands intended for the tag are queued in the tag cache, and the commands queued in the tag cache are executed in response to occurrence of an event. An entry is maintained, in the tag cache, of all the tags read by a reader within a given period of time, including all of the tag data and any pending tag commands. Interaction with the entry takes place using information in the tag cache rather than in the tag itself.

DETAILED DESCRIPTION

The present RFID tag reading system maintains a cache entry including data for all of the tags it has read in a given period, as well as any pending tag commands. The system allows upstream readers or users to interact with the cache entries rather than the tag themselves. This process optimizes power use for the tag and the tag reader, allowing 'lazy' (delayed) reads and writes, commits on request, commits on changes and other optimized command sets. The process also facilitates simulation of tags for test purposes.

Because users interact with the data associated with the tag, instead of the tag itself, unchanging data needs to be read only once-and is then stored for later reference. This frees the system from requiring the tag be 'in-field' (within range of a reader) and powered on, thus providing for faster response, greater reliability, greater flexibility and lower power consumption.

Figure 1A:
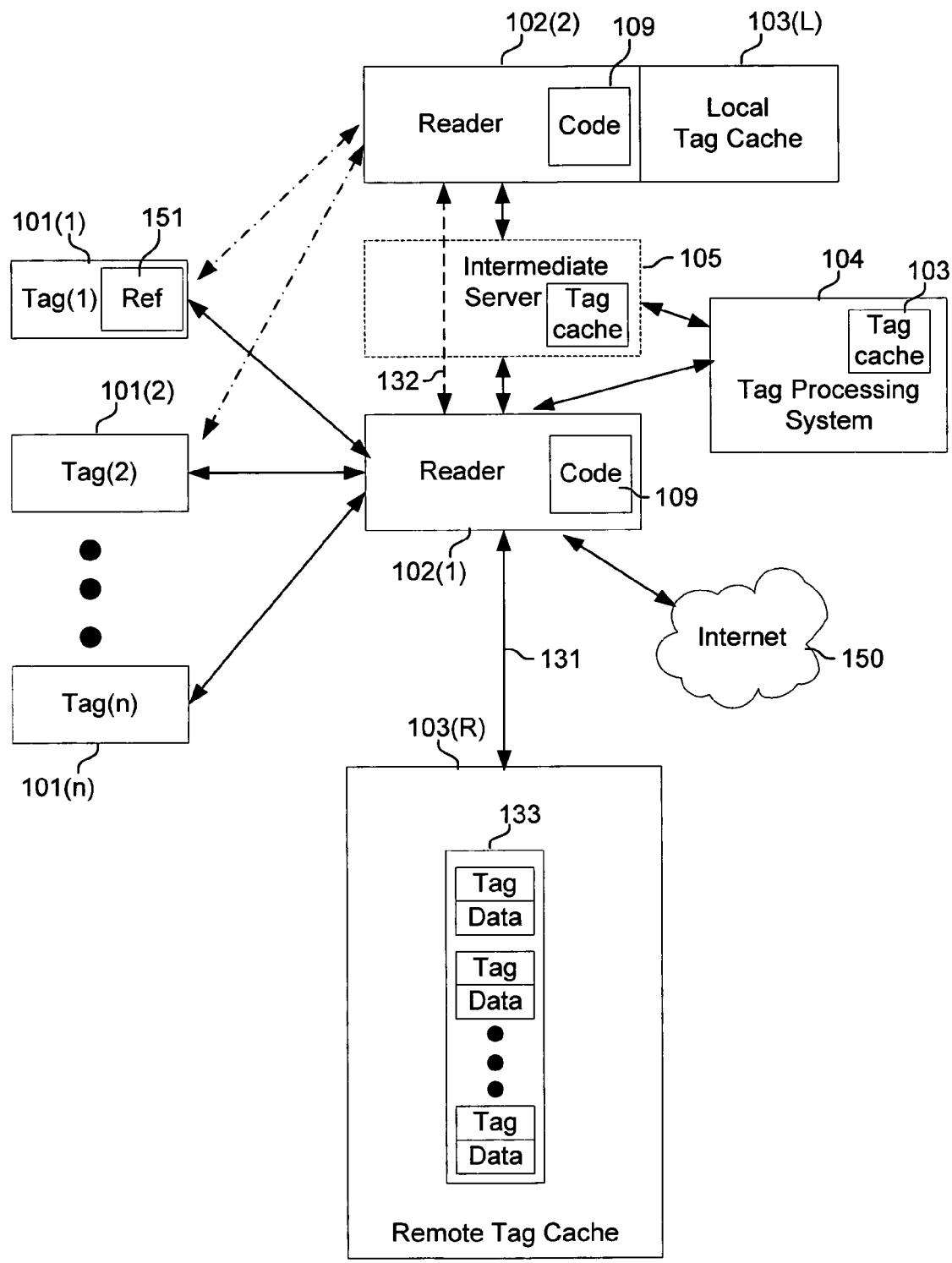
FIG. 1A is a diagram of an exemplary embodiment of the present system for reading RFID tags.

FIG. 1A is a diagram of an exemplary embodiment of the present system for reading RFID tags. As shown in FIG. 1A, the system comprises one or more receiver/interrogators 102 (hereinafter simply called 'readers') for reading tags 101, one or more cache memories 103 for storing data associated with various tags, and at least one tag processing system 104. The system may also include one or more intermediate servers 105 to provide for communication between readers 102 and between readers and the tag processing system 104.

Each reader 102 includes code 109 which implements the functions performed by the reader, as described herein. Code 109 may comprise software (executed by a processor), firmware, or a combination of both. Tag cache memory 103 is associated with each reader 102, and may be either local to a reader [e.g., tag cache 103(L)], or located remotely with respect to a reader [e.g., tag cache 103(R)] and connected to the reader via any suitable communications link 131. Tag cache memory 103 may also be co-located with server(s) 105 and/or tag processing system 104. Individual per-reader tag caches can together be considered one large tag cache 103 with potentially duplicate entries.

Tag cache 103 can be any kind of memory for storing tag information. In an exemplary embodiment, cache 103 comprises a basic in-memory data structure (hash table, tree, or other structure) indexed by the tag ID. The particular structure of a particular tag cache 103 is a function of the format (and other properties) of the tag IDs being used.

Figure 1B:
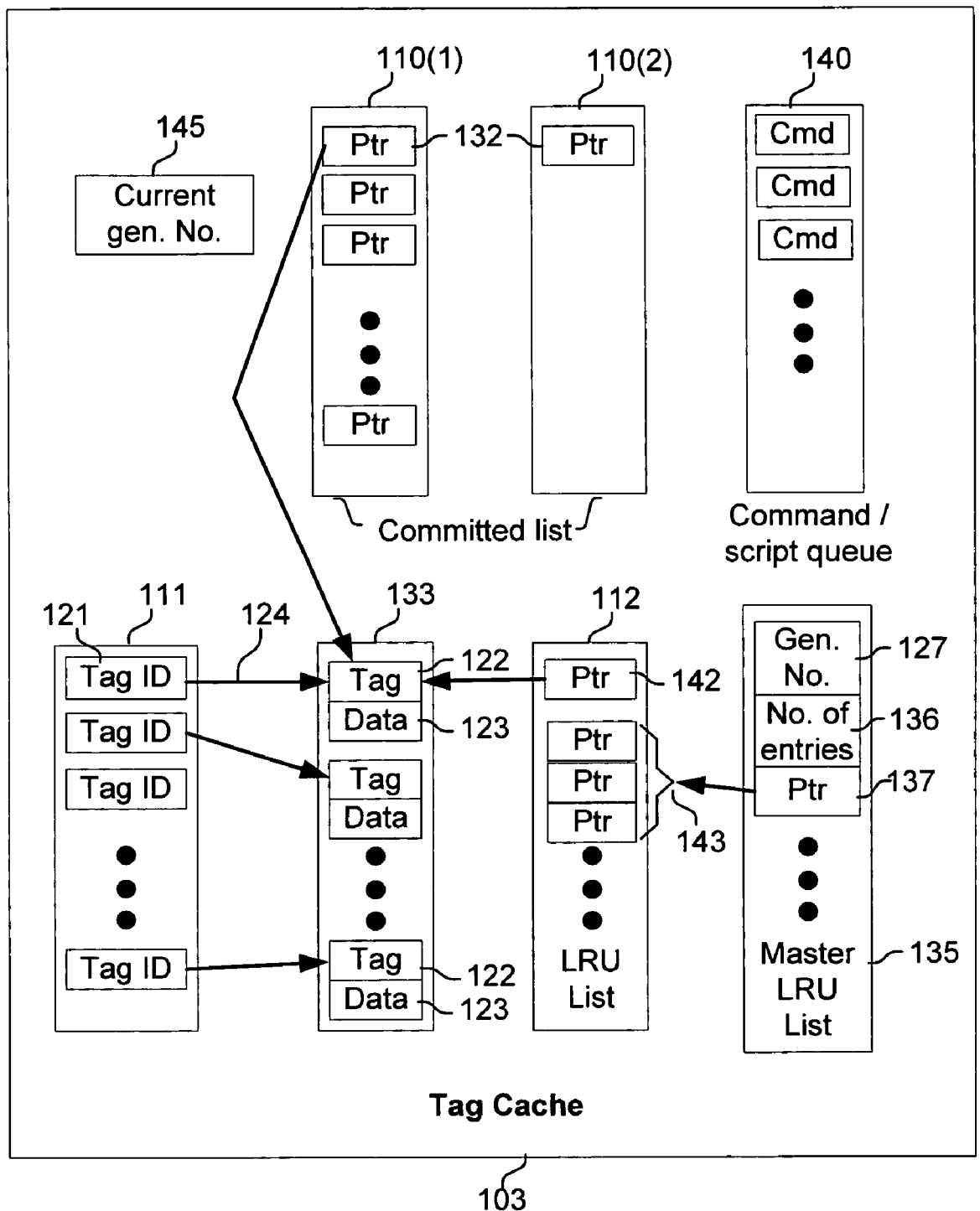
FIG. 1B is a diagram of an exemplary embodiment of cache memory used by the present system.

FIG. 1B is a diagram of an exemplary embodiment of tag cache memory 103 used by the present system. As shown in FIG. 1B, tag cache memory 103 contains data structures including a tag index 111, a cache entry buffer 133, commit buffers 110(1)/110(2), a command/script queue 140, and lists 112/135 which are used to determine least-recently-used (LRU) tag data, for cache management purposes. The data structures shown in FIG. 1B are referred to throughout this description.

Figure 2:
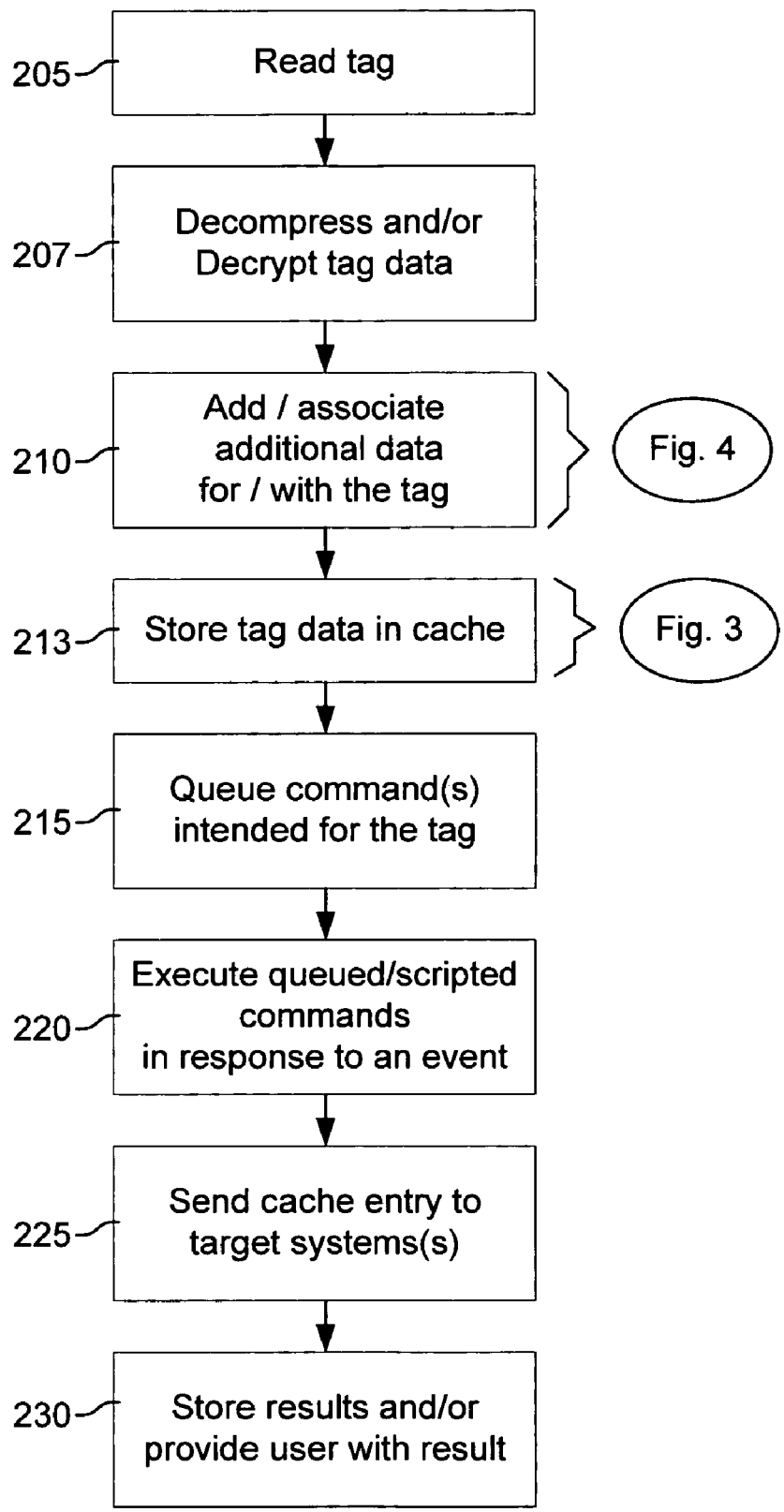
FIG. 2 is a flowchart showing an exemplary set of steps performed in operation of one embodiment of the present system.

FIG. 2 is a flowchart showing an exemplary set of steps performed in operation of one embodiment of the present system. As shown in FIG. 2, at step 205, a reader 102 reads a tag 101, and stores the tag data in an intermediate buffer (not shown). Data from the memory of one or more tags of different tag types may be read and then stored in tag cache 103 along with additional tag state information. At step 207, if the tag data is compressed, then the data is decompressed, and if the tag data is encrypted, then the data is decrypted. Re-compression and/or re-encryption is performed on appropriate data, if necessary, prior to the data being sent (back) to a tag in step 225 (described below). If tag data is to be encrypted, tag cache 103 also includes encryption key storage.

Figure 3:
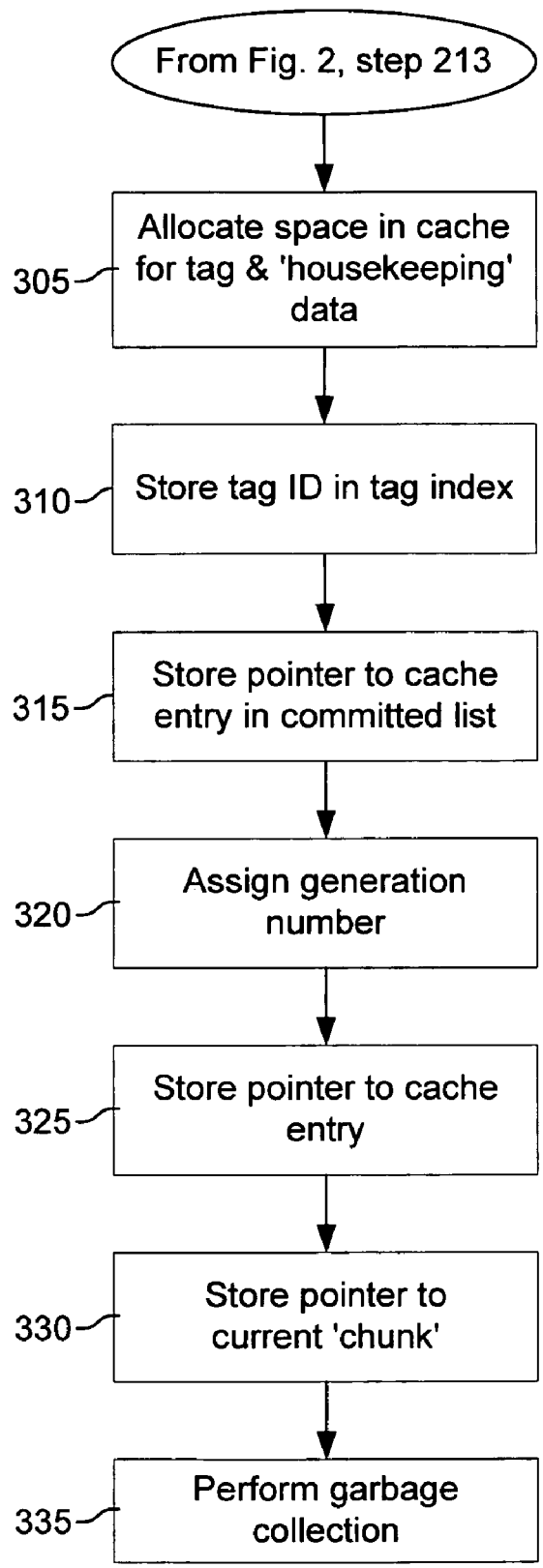
FIG. 3 is a flowchart showing an exemplary set of steps performed in managing cache memory.
Figure 4:
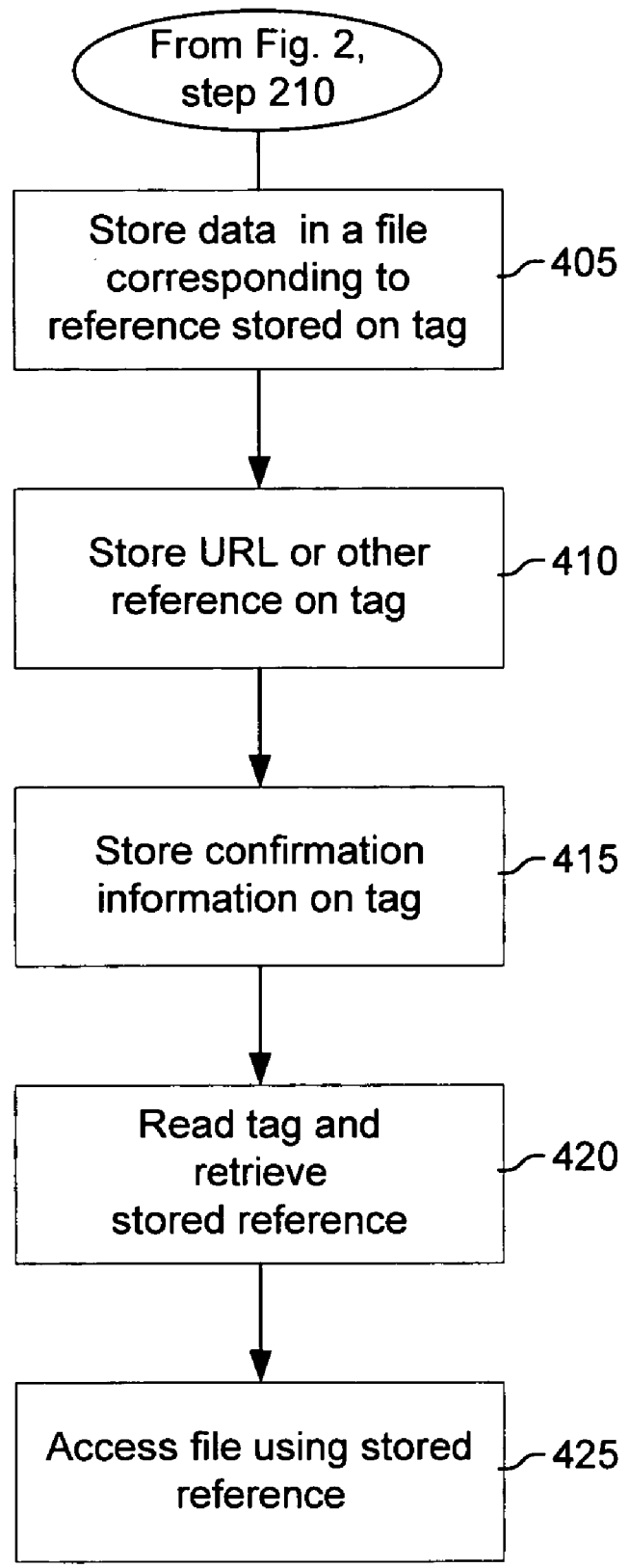
FIG. 4 is a flowchart showing an exemplary set of steps performed in adding additional data for a tag.

At step 210, additional data may be added to, or associated with, a tag, as described in detail below with respect to FIG. 4. At step 213, the data for the tag 101 is stored in cache memory 103, as described below with respect to FIG. 3. The remaining steps shown in FIG. 2 are described further below.

Cache Organization and Management

In an exemplary embodiment, the present system maintains a cache entry (in buffer 133) of all the tags it has read in a given period, including all of the associated tag data, as well as age since last transaction, which is optional. FIG. 3 is a flowchart showing an exemplary set of steps performed in managing cache memory. As shown in FIG. 3 at step 305, after a reader 102 reads a tag 101, space in cache is found and allocated for tag data & 'housekeeping' data, and the data associated with the tag is then stored in cache 103. This tag-associated data 123 may be kept in-line with the cache entry 122 (as shown in FIG. 1B) if the data is fixed length (all cache entries are preferably, but not necessarily, the same size). If the tag data is of variable length, or even if it is fixed size, the data may be stored in memory (in tag processing system 104) separate from a particular cache 103, to be managed separately.

At step 310, each current tag read by a reader 102 and the data 123 associated therewith is indexed by tag ID and stored in tag index 111, which provides a pointer to the tag stored in cache entry buffer 133 in tag cache 103. Each time a tag entry is written to in cache 103, it is a candidate to be flushed from the cache and sent to the actual tag the next time there is a transmit operation. Thus, a list 110(1)/110(2) of changed entries is kept. At step 315, a pointer to cache entry is stored in a 'committed' list 110. In one embodiment, this list 110 is an array of pointers 132 kept in one or more buffers. Each time there is a transmit operation, the system starts at the top of the list 110(1) in the first buffer, follows the pointer to the cache entry to get the next value and writes it out to the tag. Once the tag has ACK-ed receiving the value to be written, the pointer is removed from the list.

If the tag is not immediately available, it is kept in the committed list 110. Any non-ACK'd transmissions are copied to a 'next' section of the committed list 110(2), so that there are two lists/buffers used for storing for committed transactions: the 'current' list 110(1) and the 'next' list 110(2). The 'next' list 110(2) is generally empty, but it can be used in the event that data is being changed in cache 103 while a transmission is occurring. If a tag does not respond with an 'ACK' within a predetermined time, it is treated as non-existent, and stored for possible later use.

Alternative embodiments of the present system may include any of the following mechanisms and formats, which have been standardized across all readers 102 and tag caches 103:

- a standardized mechanism for locating a specific tag with respect to an interrogator. In the case where the caches 103 of multiple readers are searched with a search engine, looking for a value stored on the tag, or stored data about the tag, the matches can be reported in order of decreasing likelihood of fit, and the user can then select the best-fit tag—which should also reveal which interrogator last communicated with it. If the cache 103 itself is 'reader-centric' (showing all tags one reader has seen), finding all the entries for a given tag across multiple reader tag caches is 'tag-centric'.
- a standardized mechanism for reporting the presence or absence of a tag with respect to a reader, with the command embodied as XML fragment, for example:
  <TagPresent epc="12345abcde/>
- a standardized mechanism for reporting a state change of a tag with respect to a reader, with the command embodied as XML fragment, for example:
  <NotifyOnTagStateChange epc="74087038" toState="KILLED"/>

Generation Numbers

In one embodiment, each time a reader 102 reads in one or more tags associated with the same (multiple) tag read operation, the tags are stored in cache (if a particular tag is not already stored there), and conditionally assigned a current generation number 145 (at step 320). A tag generation number 127 is associated with each tag that is read. If a tag is already in cache 103, then if reading it again (i.e., the current tag read operation) is considered to make the tag 'used', the generation number in the cache entry is updated to the current generation; otherwise the generation number is not updated at this time.

A pointer 142 to each entry 122/123 is stored in the current LRU chunk 143 for this generation, in LRU list 112, at step 325. The number of entries in the generation is stored in a master LRU list 135 along with a pointer 137 to the chunk, at step 330. When garbage collection (described in detail below) is needed, starting at the lowest non-zero count entry in the LRU master list 135, each remaining (non-zero) pointer in the chunk is checked to see if it has the generation number of the current lowest generation (as it is possible that none of the entries in the chunk will have it). If so, that entry is erased from cache 103 and LRU lists 112 and 135. If there are no current lowest generation number-matching entries available in the current chunk, the next chunk is examined. It is an error if no entry can be found that matches the current lowest generation number known, but a check should be made to prevent possible anomalous system behavior. Each time a multiple read operation is completed, the generation number 145 is incremented.

When cache memory 103 fills up, LRU list 112 is scanned from the current 'start' point (which may be kept in a separate register that always points to the last entry that was queried during the previous LRU cleanup; initially the register points to the first item). It is 'optimistically' assumed that the start pointer is fairly close to the oldest tag so that it is not necessary to scan the entire LRU list to find vacant slots. There is also a pointer to the end of the LRU list, and the start can never pass the end (and vice versa). The length of the LRU list 112 thus determines how many tags can be held in memory. In one embodiment, each tag entry is 4 bytes in length.

Garbage Collection

Since the cache can only grow to a certain size, a method of removing stale cache entries ('garbage collection'), such as a simple LRU (least-recently-used) mechanism, is required. The LRU list 112 itself is a list (or stack) of fixed length entries. Each entry in LRU list 112 comprises a pointer 142 to its representative entry 122/123 in cache. These LRU entries 142 may function as 32 bit addresses. Thus, when the LRU list is full, garbage collection is performed, at step 335. One way to determine when garbage collection is necessary is to keep a count of the number of free slots in the LRU list. When the number of free slots is zero, it is time to 'clean up' the LRU list by performing garbage collection, erasing least-recently used entries in the LRU list. Erasing an LRU entry may include writing four 0x00 values to the entry.

In an exemplary embodiment, the garbage collection process begins by referencing the 'start' pointer to determine the generation number of the associated entry. The first tag with the lowest generation number is found and then erased. This process requires that additional data values be kept. The first of these values is the current lowest generation number associated with actual cache entries. For each generation number, a count is kept of the number of tags in the generation. As long as the lowest generation number still has a count greater then zero, the LRU list is scanned for that entry. By definition, the entry must be in the same 'chunk' as the one in which it was written when it first entered the reader. If the pointer to the slot in the LRU list for the starting point for that particular generation is kept with each generation index (that has the count), then the start pointer is no longer required. Instead, the system starts at the beginning of the generation 'chunk' which is stored in the generation count list. Thus the generation count list now contains both a count and a pointer to where in memory the chunk is located—this also means that the chunks themselves need not be contiguous. Once the generation count is zero, the associated chunk can be deallocated. As an optimization, below a certain threshold, those remaining entries can be copied to their currently marked generation. The chunk block is then re-allocated, and the original entries plus these leftover entries are copied into one contiguous block.

Queuing

Tags presently in use must receive commands as they are issued (and thus must be in-field for the command to work). If several commands do essentially the same thing (such as writing a value) but only the last one matters (e.g., a total count), previous systems require that the tag still be powered up and written to for each command. The present system allows commands to be queued in a command/script queue 140 until an unavailable tag is available (or until some other event occurs), so the user (or the system) does not have to remember to reissue the commands. Command/script queue 140 allows several commands to be discarded or combined and a single command sent that achieves the same final result as multiple commands. This queuing method saves power, reduces user interaction, and allows tag mobility.

In addition to queuing commands, event-triggered scripting commands may also be stored in command/script queue 140 in cache 103. Commands include requests such as "read location X from tag, write a value to location Y, and then lock the tag". This can be viewed as a sequence of standard commands combined in some order and intended to execute in that order without intervention.

At step 215 (in FIG. 2), commands intended for the tag, if any, are queued in command/script queue 140. At step 220, the queued/scripted commands are executed in response to an event, based on tag data or EPC/tag ID. Execution of these commands may include sending tag data 123 back to a tag 101. Events may include any event or situation that is of interest to a particular system. For example, a tag with a certain EPC/UID enters a field, the tag contains a certain value at a certain location, a timer expires, a certain time is reached, an external message is received, etc.

In one embodiment, a tag command set is embodied as XML via HTTP. The commands in this command set may be carried as XML fragments in an HTTP POST. Tag commands may include commands such as the following:

<ReadTag epc="3829389" start="0x00" size="0x4"/>
<WriteTag epc="deadbeef" start="0x00">
[Data]
</WriteTag>
<LockTag epc="decaf" start="0x03" size="0x4"/>
<KillTag epc="abcdef"/>

Event-driven filter commands may include commands such as:

<FilterEPCByRegularExpression       ex="(ab|bc·.·de)?1234"/>
<FilterTagContentsByMemoryValue start="0x4">
[Value]
</FilterTagContentsByMemoryValue>

Command sets may include commands which:
  interact with the actual tags 101 to confirm tag state changes;
  lock all tag interactions to a specific reader 102 and/or cache 103;
  interact with a tag 101 at a minimum polling frequency; and/or
  minimize actual tag interactions until actually necessary (such as when a tag is about to leave a field).

Tag interactions may include locating tags by any stored value in the cache (by searching cache 103) and/or writing data to tag memory. For example, in a drug pedigree system, the system may instruct tag cache 103 to write a distribution center's UID to all tags exiting the building. A container tracking system may write manifest information to the tags.

At step 225, the cache entry 122/123 is sent to one or more intended (target) systems potentially including other readers 102 and/or processing system 104. The present system provides the capability to allow user interactions with a given tag to be routed to the correct reader 102. Results are then stored and/or sent to a user and/or to tag processing system 104, at step 230. A reader 102 may issue a command and flag it such that if the command is not executed against the tag within a given period of time, then the command fails.

Tag Cache Exchange

A reader-to-reader protocol allows readers 102 to request and exchange cache entries. This process may include determining that a tag is moving toward another reader 102 and sending that reader the cache entry in advance of the tag's arrival.

One or more mechanisms, known in the art, may be employed for readers to exchange tag cache entries, both with an intermediate server and peer-to-peer. These tag cache exchange mechanisms fall into three general categories:

(1) Push

Either on an event (such as a tag leaving a reader's field) or at a regular interval, the reader pushes one or more tag entries to any readers in a given system or to a central repository, which can keep entries for all known tags.

(2) Pull

Again, event or time based, in this model a reader requests one or more tag entries (such as when a new tag enters its field) from other readers or a central repository. One mechanism to accomplish this is IP multicast carrying the requested tag ID and an optional maximum age. All entities with an entry for that tag ID (potentially filtered by the maximum age of the entry) respond with an ACK, a count of pending global or group operations against the tag, and a time value representing the last interaction with the tag. The pulling reader then makes a specific request to the reader or readers that it wants to get data from in the order in which it wants to receive the entries (writing each one in succession so that it ends up with a composite entry). Other readers can listen and update themselves simultaneously.

There may be operations (e.g., write) that can take place anywhere (globally), there may be some operations that must occur at a specific grouping of readers (such as ones at exit doors) and some which can only occur at a specific reader and therefore not offered to the requestor.

(3) Publish and Subscribe

A reader may subscribe to any events around a specific tag ID or condition (e.g., anytime a tag leaves a building). In this case, readers observing or generating such events may publish cache entries to the subscribers. This allows a 'find me, follow me' service based on RFID. For example, as a person walks (with a tag-enabled badge) through the halls of a hospital, readers are updated with the person's cache entry as the person enters the readers' fields. Simply tracking the cache requestors versus a spatial map of installed readers provides an effective trajectory. The cache entries will accumulate all the pending activities that would otherwise be missed by walking too fast, but when the person stops, the local reader updates the tag as needed, while simultaneously updating the person's location.

Background Process

It is also possible to exchange cache entries as a background process, instead of, or in addition to, the methods described above. This exchange process is typically implemented as a 'blanket' push. In this mode, readers are constantly exchanging cache entries when they have processor or communications bandwidth to do so. As a result, all caches become more or less equivalent over time.

Tag Cache Exchange Protocol

In one embodiment, the present system includes a transport-independent protocol for tag caches 103 to interact with each other. An example protocol command set embodied as XML fragments is set forth below:

Query:
  <ContainsTagByEPC epc="123456"/>
  <SendTagsSeenAfter time="23:45:12T12052005MST"/>

Alerts/Notification:
  <NotifyOnEPCRegularExpression ex="gsn:[0-9]{5}[A-Za-z]{5}"/>

In one embodiment, the present system employs a standardized format for the exchange of tag cache entries, with the command embodied as XML fragment, for example:
  <SendTagsSeenAfter time="23:45:12T12052005MST"/>

A standardized format for the exchange of queued commands may also be employed, with the command embodied as XML fragment, for example:
  <QueryPendingOps epc="2382938039843"/>

Virtual Tags

RFID tags presently in use are limited to the capabilities inherent in the tag. In multiple tag environments, previous systems are typically forced to use the common subset of tag capabilities, and have limited ability to support new, enhanced tags. The present system provides a 'virtual tag' in cache memory, which can provide a superset of the capabilities of a given tag by simulating common capabilities. A virtual tag, comprising data stored in one or more tag caches 103, for example, tag caches 103(L) and 103(R), can simulate a memory area larger than that physically present on the tag in several different ways.

In an exemplary embodiment, tag cache entries have a canonical format (i.e., a virtual tag format) that provides a superset (or subset) of the capabilities of the tags and tag types supported. For example, a virtual Tag may have more memory, finer access controls, more or different security features, exhibit "always on" and "always connected" behaviors, and/or faster read/write rates than a corresponding physical tag.

Example of a Virtual Tag:
  struct VirtualTag{
    unsigned char EPC/UID[64];
    time_t TimeLastSeen
    time_t TimeFirstSeen
    acl_t*ACLS;
    unsigned char Memory[1024];
    tag_operation_t*PendingOperations;
  }

In one embodiment, the canonical format of the tag cache entries includes support for writing an off-tag data storage location [e.g., URL, database location, and optionally a confirmation or authentication value (e.g., a hash)] to the tag, rather than the data itself.

A virtual tag can be employed to store a reference 151 (such as a URL) to the data on the tag (real tags can store a reference as well), where the actual data (which may be too large to fit into tag memory) is stored in another location. FIG. 4 is a flowchart showing an exemplary set of steps performed in adding additional data for a tag 101, or replacing existing tag data. As shown in FIG. 4, at step 405, data (which may be too large to fit into tag memory) is stored in an entity separate from the tag itself, such as in a file or database in tag processing system 104, to be located using a reference 151 to be stored on the tag. At step 410, additional or replacement data is written to a tag 101 and stored on the tag. This data may include a reference 151 such as a URL, or a reference to the actual data itself.

An optional confirmation value (typically a hash) can also be stored on a tag 101, as indicated by step 415. This allows the tag cache (typically hidden from the user) to verify that the stored data is the correct and up-to-date data on the tag.

In operation, the tag 101 is read and the reference 151 stored on the tag is retrieved, at step 420. Then, at step 425, the file or other entity is accessed via the reference 151 stored on the tag.

Individual Tag Web Pages

A web-enabled reader, e.g., reader 102(1) connected to the Internet 150, allows access to individual tags 101 by publishing per-tag web pages. These web pages present tag data and allow changes to that data via familiar web controls. The web page to be accessed may present a password dialog to require users to log in to the tag to perform operations. The web page can be exported as XML via a service such as RSS to provide a simple machine interface to the tag.

Tags 101 are not always powered on and connected to a tag-reading system—passive tags are only on and connected when an interrogator is powering them, and active tags 'sleep' to conserve their battery when not being accessed. However, the Internet and enterprise infrastructure are most commonly connected and 'always on' (such as in the case of internal and external IP networks), with connected devices able to be located easily. The present system allows the tag cache to act like an always-on device and connected proxy for the tag itself, allowing existing networks to seamlessly work with what appears to each as the tag itself. In this way, a chair, for example, could be connected to the internet simply via a tag placed on it. In this example, cache 103 presents a web page for the chair, and the web page may be visited, examining data items such as the chair type, what room it is in, and who is sitting in it (if the person is wearing a badge containing a tag). This allows essentially anything to be connected to the internet via an inexpensive tag (e.g., a tag costing less than 20 cents). Cache 103 may also sustain a secure synchronous connection (such as SSL) on behalf of the tag.

In one embodiment, SSL protocol from a web browser to a tag reader can be combined with secure tag protocols (e.g., Philips MIFARE or DesFire) to create seamless security from web browser to tag. The binding can be strengthened between the protocols by establishing a relationship between the SSL session keys and the tag protocol session keys (timing out and renewing together, for example).

The present system allows data to be stored across multiple smaller memory tags and presenting the tags as a single larger memory tag. For example, a maintenance record update may be stored in a tag applied to a machine (medical device, car, airplane) each time it is maintained. The cache presents the record as a single, coherent file even though it may actually be stored on many individual tags. This is useful for simulating larger memories, and also for closely associating non-contiguous data.

Security

A virtual tag can simulate security features not physically present on the tag by:

encrypting data before storing it on the tag and decrypting the data after reading it from the tag (managing the keys in the tag cache), allowing tags without on-tag encryption and decryption capability to support this feature.

requiring that the user authenticate (for example, by logging-in to a 'tag web page' presented by the cache) before accessing any or specific data areas. Even if the tag does not support access control, the tag cache may simulate it by controlling such access.

simulating layered or nested security in a tag (such as a patient wrist bracelet with their medical record embedded, allowing the doctor to access all information in the tag, the nurse less information, the insurance company still less information, etc.) by combining encryption and access control.

Multiple nested levels of security may be applied to tag data, to allow fine-grained access control to the tag data based on authentication. However, tags typically have limited computing resources. To circumvent this limitation, there can be a single encryption key for the tag data, held by the reader. The reader then presents a 'virtual tag' to the outside world, which simulates a tag with granular access control. The reader uses its global access (essentially acting in 'superuser' mode) to perform the actual tag transactions.

Tag Search

Tag cache 103 maintains the ID and data of the tags that have been read within a certain period of time, and via reader-to-reader cache updates, each reader 102 can mirror the tags of any other reader. This process allows users to search (via traditional search engine technology if there are per-tag web pages) all tags 101 and readers 102 (connected to the present system) for a specific value (e.g., ID, state, contents). The use of tag cache 103 makes this process viable, as requests do not require energizing the reader and tag for every request.

Certain changes may be made in the above methods and systems without departing from the scope of that which is described herein. It is to be noted that all matter contained in the above description or shown in the accompanying drawings is to be interpreted as illustrative and not in a limiting sense. For example, the methods shown in FIGS. 2 through 4 may include steps other than those shown therein, and the system shown in FIGS. 1A and 1B may include different components than those shown in the drawings. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall there between.

What is claimed is:

1. A method for implementing a virtual tag in an RFID tag reading system comprising:

reading tag data from the memory of an RFID tag and storing the tag data in tag cache memory;

queuing commands, intended for the tag, in the tag cache; and executing the commands, queued in the tag cache, in response to the occurrence of an event;

wherein interaction between the tag reading system and the tag data takes place using information in the tag cache rather than in the tag itself.

2. The system of claim 1, including providing a result as if the commands intended for the tag had been applied to the tag at the time of an initial request to send the commands to the tag.

3. The method of claim 1, wherein the data stored in the tag cache is updated via a command script queued in the tag cache.

4. The method of claim 1, wherein the data stored in the tag cache is updated via data sent from a separate tag cache.

5. The method of claim 1, including sending, to the tag, at least one of the commands queued in the tag cache in response to occurrence of an event comprising a tag being detected moving toward a particular tag reader's field; and wherein the cache entry is sent in advance of arrival of the tag within the tag reader's field.

6. The method of claim 1, wherein the commands are flagged such that if the command is not executed against the tag within a given period of time, then the command fails.

7. The method of claim 1, including maintaining an entry in the tag cache of all the tags read by a tag reader within a given period of time, including all of the tag data and any pending tag commands; wherein interaction with the entry takes place using information in the tag cache rather than in the tag itself.

8. The method of claim 1, wherein data stored in the tag cache has a canonical format that provides a superset of the capabilities of the tags that are read.

9. The method of claim 8, wherein the canonical format supports writing an off-tag data storage location to the tag, rather than writing the data itself to the tag.

10. The method of claim 9, wherein the off-tag data storage location is denoted by a URL.

11. The method of claim 10, including writing an authentication code and an off-tag data storage location to the tag, wherein the off-tag data storage location is denoted by the URL.

12. The method of claim 11, wherein the URL denotes a per-tag web page containing tag-associated data.

13. The method of claim 1, wherein the commands queued in the tag cache include at least one command selected from the set of commands consisting of (1) a command which interacts with the actual tags to confirm tag state changes, (2) a command which locks all tag interactions to a specific reader, (3) a command which locks all tag interactions to a specific cache, and (4) a command which interacts with a tag at a minimum polling frequency.

14. The method of claim 1, wherein an encrypted copy of the tag data is stored on the tag, and a decrypted copy of the tag data is stored in the tag cache.

15. The method of claim 1, wherein a compressed copy of the tag data is stored on the tag, and a decompressed copy of the tag data is stored in the tag cache.

16. The method of claim 1, wherein nested tag data security and access control is provided by a single encryption key for the tag data, stored in the interrogator, which simulates a tag with granular access control.

17. A method for simulating a memory area larger than that physically present on an RFID tag comprising:

generating a virtual tag comprising data read from more than one said tag and stored in a tag cache memory;

wherein the virtual tag stores a reference to the data on the tag, the data referenced being stored elsewhere.

18. The method of claim 17, wherein the reference is a URL.

19. The method of claim 17, including storing an authentication code on the tag; wherein the reference is a URL.

20. The method of claim 17, wherein the reference is an address of a file containing data for the tag.

21. A method for implementing a virtual tag in an RFID tag reading system comprising:

reading data from the memory of an RFID tag and storing the data in tag cache memory;

updating the data stored in the tag cache;

queuing commands intended for the tag, including event-triggered scripting commands, in the tag cache;

executing the commands based on an event;

providing a result as if the commands had been applied at the time of an initial request for execution thereof; and executing the commands, queued in the tag cache, in response to occurrence of an event.

22. The method of claim 21, wherein the data stored in the tag cache is updated via queued cache commands/scripts.

23. An interrogator for simulating a plurality of RFID tags comprising:

tag cache memory including space allocated for storing tag data read from the tags;

a command/script queue in the tag cache for queuing a plurality of tag commands; and an entry in the tag cache containing data stored in all of the tags read by the interrogator within a given period of time, and containing any pending tag commands, to facilitate interaction by another interrogator with the entry in the tag cache rather than the tags themselves;

wherein the data in the tag cache is sent to an external device in response to an event.

24. The interrogator of claim 23, including sending a single command to one of the tags that achieves the same final result as the plurality of commands stored in the command/script queue.

25. The interrogator of claim 23, wherein an encrypted copy of the tag data is stored on one of the tags, and a decrypted copy of the tag data is stored in the tag cache.

26. The interrogator of claim 23, wherein a compressed copy of the tag data is stored on one of the tags, and a decompressed copy of the tag data is stored in the tag cache.

27. The interrogator of claim 23, including an authentication code and an off-tag data storage location stored on the tag, wherein the off-tag data storage location is denoted by a URL denoting a per-tag web page containing tag-associated data.

28. The interrogator of claim 23, wherein nested tag data security and access control is provided by a single encryption key for the tag data, stored in the interrogator, which simulates a tag with granular access control.

29. A system for integrating multiple RFID tag caches comprising:

a plurality of tag caches including space allocated for storing data read from a plurality of RFID tags;

a transport-independent protocol to control data exchange between the tag caches;

a standardized format for the exchange of entries in the tag caches;

a standardized mechanism for locating a specific tag with respect to an interrogator;

a standardized mechanism for reporting the presence or absence of a tag with respect to the interrogator; and a standardized mechanism for reporting a state change of a tag with respect to the interrogator.

30. The system of claim 29, including:
a command/script queue in the tag caches for queuing a plurality of tag commands;
a standardized format for the exchange of commands queued in the command/script queue; and
a mechanism for routing user interactions with one of the tags to an appropriate said interrogator.

31. The system of claim 29, wherein the tag commands include at least one command selected from the set of commands consisting of (1) a command which interacts with the actual tags to confirm tag state changes, (2) a command which locks all tag interactions to a specific reader (3) a command which locks all tag interactions to a specific cache, and (4) a command which interacts with a tag at a minimum polling frequency.

32. The system of claim 29, wherein an interrogator-to-interrogator exchange of cache entries occurs, including the step of determining that a target tag is moving toward a second interrogator, and sending a tag cache entry to the second interrogator in advance of arrival of the target tag within the field of the second interrogator.

33. An RFID tag reading system for implementing a virtual cache comprising:
tag cache memory for storing tag data read from the memory of an RFID tag; and
a command/script queue, in the tag cache memory, for queuing commands intended for the tag;
wherein the commands, queued in the tag cache, are executed in response to occurrence of an event;
wherein interaction between the tag reading system and the tag data takes place using information in the tag cache rather than in the tag itself.

34. The system of claim 33, including means for providing a result as if the command had been applied to the tag at the time of an initial request to send at least one of the commands to the tag.

35. The system of claim 33, wherein the data stored in the tag cache is updated via data sent from a separate tag cache.

36. The system of claim 33, sending, to the tag, at least one of the commands queued in the tag cache in response to occurrence of an event comprising a tag being detected moving toward a particular tag reader; and wherein the cache entry is sent in advance of arrival of the tag within the field of the reader.

37. The system of claim 33, wherein the commands are flagged such that if the command is not executed against the tag within a given period of time, then the command fails.

38. The system of claim 33, including an entry in the tag cache of all the tags read by a tag reader within a given period of time, the entry further including all of the tag data and any pending tag commands; wherein interaction with the entry takes place using information in the tag cache rather than in the tag itself.

39. The system of claim 33, wherein data stored in the tag cache has a canonical format that provides a superset of the capabilities of the tags that are read; and
wherein the canonical format supports writing an off-tag data storage location to the tag, rather than writing the data itself to the tag.

40. The system of claim 39, wherein the off-tag data storage location is denoted by a URL.

41. The system of claim 33, wherein an authentication code and an off-tag data storage location are stored on the tag, wherein the off-tag data storage location is denoted by a URL.

42. The system of claim 33, wherein the commands queued in the tag cache include at least one command selected from the set of commands consisting of (1) a command which interacts with the actual tags to confirm tag state changes, (2) a command which locks all tag interactions to a specific reader (3) a command which locks all tag interactions to a specific cache, and (4) a command which interacts with a tag at a minimum polling frequency.

* * * * *